Feb. 7, 1967   C. J. HOLTKAMP   3,303,326
OVEN TEMPERATURE CONTROL
Filed April 20, 1964
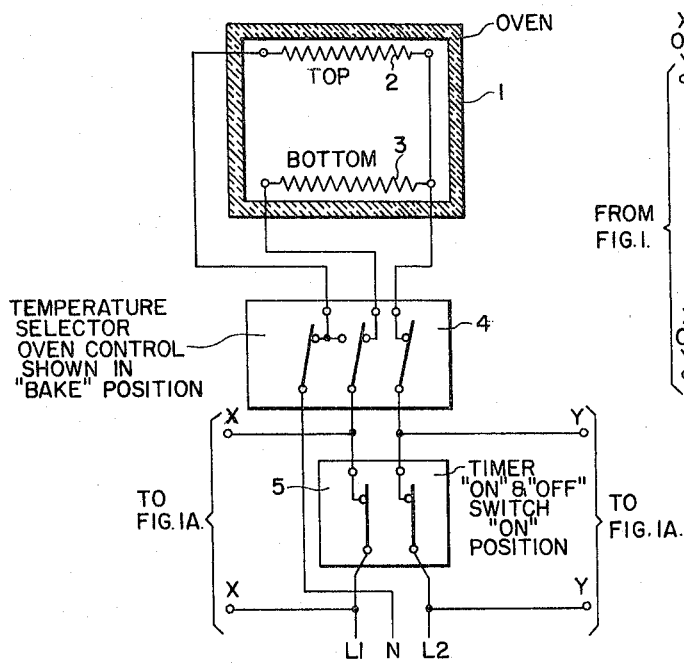
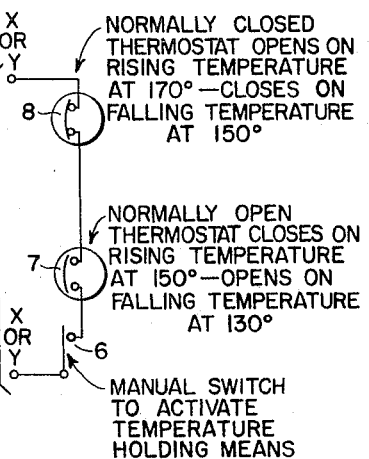
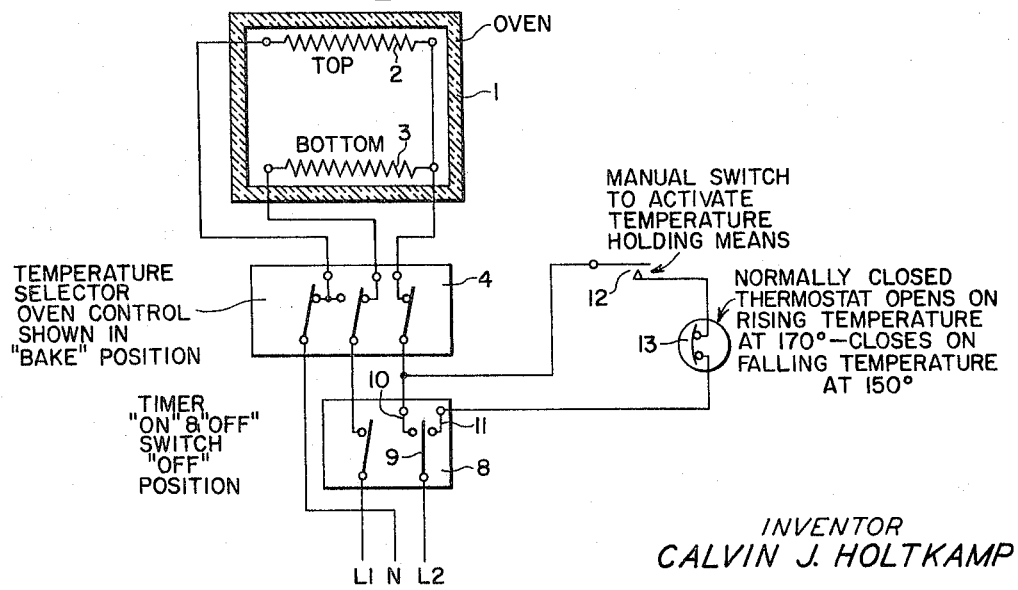
INVENTOR
CALVIN J. HOLTKAMP
BY Robert T. French
ATTORNEY United States Patent Office 3,303,326
Patented Feb. 7, 1967

3,303,326
OVEN TEMPERATURE CONTROL
Calvin J. Holtkamp, Mansfield, Ohio, assignor to Westinghouse Electric Corporation, Pittsburgh, Pa., a corporation of Pennsylvania
Filed Apr. 20, 1964, Ser. No. 361,133
2 Claims. (Cl. 219—494)

This invention relates to means for controlling the temperature of an oven and particularly to means for producing a holding temperature, that is, a temperature less than that used for cooking, but high enough to keep the contents of the oven warm.

The object of the invention is to provide means which will function after a cooking operation has terminated to hold the temperature in the oven at a point where the contents will remain warm.

In accordance with this invention a bypass circuit for the heating means is provided which will be effective at the holding temperature to operate this heating means when the temperature in the oven has gone down to this point and to stop the operation of the heating means when the temperature has risen to and above this point. The invention resides in the cooperative use of two controls, one to render the circuit effective only after the oven temperature has reached the holding temperature on a downward movement and another to hold the oven temperature at a given point. Such means may be conventional thermostatic means.

The invention may be embodied in various forms, in one of which both the starting and holding means may be thermostatic devices so that it is not until the oven has been driven up in temperature beyond the holding temperature to the operating temperature that the thermostat controlling the holding temperature can become effective. In another form the starting circuit may be embodied in the timer device so that the holding temperature thermostat cannot become effective until after a timed cooking operation has been completed.

A feature of the present invention is the use of a bypass circuit bridged about the conventional timer operated control contacts which will remain inert until the temperature within the oven has risen to the holding temperature and which will thereafter function to maintain this said holding temperature. In one form this means consists of a pair of thermostats wired in series, one of which presents a normally closed circuit at temperatures below the holding point and the other of which presents a normally open circuit at temperatures slightly below the said holding point. Thus the said normally open contact prevents the functioning of this bypass circuit when the oven is not being used and during the normal use of the oven until the temperature therein has been driven up to and beyond the holding temperature. In another form the functions of this normally open thermostat may be embodied in the oven timer switch which is then provided with back contact means which does not become closed until a timed operating period has been completed.

The foregoing and other objects are effected by the invention as will be apparent from the following description taken in connection with the accompanying drawings, forming a part of this application, in which:

FIG. 1 is a schematic circuit diagram, entirely conventional except for wiring XX and YY, to which a circuit shown in FIG. 1A may be connected to provide the novel features of the present invention;

FIG. 1A is a schematic diagram of a circuit which may be connected into a conventional oven control to provide a means for maintaining the oven at a given degree of warmth after the set cooking operation has been completed, and FIG. 2 is a schematic circuit diagram showing an alternative arrangement in which a normally open thermostat for sensing the oven temperature is replaced by a back contact on the conventional on and off switch which will produce the same results.

In the drawings the oven 1, shown schematically as an insulated box, holds a top heating element 2 and a bottom heating element 3. When the temperature selector represented by the box 4 has been set to the bake position, and the on and off switch of the timer represented by the box 5 has been set to the "on" position, the power supply will be seen to be connected to the heating elements, so that the bottom element will be connected between L2 and L1 and the top element will be connected between L2 and N (neutral). In accordance with conventional arrangements, an oven thermostat is provided to interrupt these circuits when the temperature in the oven exceeds the figure set by the temperature selector, but since this thermostat remains constantly closed after the cooking operation has been completed and while the lowered temperature is being maintained, it is not shown herein.

When the bypass circuit of FIG. 1A is connected to the terminals XX, the bottom heater 3 will at times be connected in series with the top heater 2 between the power terminals L1 and N. When this bypass circuit is connected to terminals YY, the top heater 2 alone will be connected between the power terminals L2 and N.

The bypass circuit FIG. 1A is what may be termed a temperature holding means and it operates to hold the temperature of the oven at a predetermined lower temperature to keep the contents of the oven warm indefinitely after the cooking operation has been completed.

By means of the conventional timer 5 the oven may be turned "on" and the contents subjected to a temperature of, say, 400° for, say, three hours, after which the oven will be automatically turned "off." Thereafter the bypass circuit of FIG. 1A will come into operation to maintain the oven at a steady temperature of between 170° and 210° indefinitely. This circuit is provided with a manual switch 6 which may be closed to render this means effective. A normally open thermostat 7 will be closed as the oven heats on a rising temperature of substantially 150° and will thereafter remain closed until the use of the oven has been discontinued when it opens on a falling temperature of substantially 130°. This normally open thermostat 7 provides means for a delayed start of the cooking for it maintains an open circuit until the oven temperature has risen to about 150°. Therefore, the timer may be set conventionally to start the cooking in, say, two hours and thereafter carry out the cooking operation for, say, three hours before shut down. During this period and until the manual switch 6 has been opened, the normally closed thermostat will become closed as the oven cools to a temperature of substantially 150° and as the oven again warms up will become open as the oven reaches a temperature of substantially 190°.

In the arrangement shown in FIG. 2 the normally open thermostat 7 is not used, but its function is taken over by a conventional contact means in the timer 8. Here the contacts are in the positions shown in FIG. 2 when this device is in the "off" position. When the on-and-off switch is driven to its "on" position, the power terminal L2 will be connected through the switch blade 9 to its front contact 10 to provide the same circuit as shown in FIG. 1. However, when the cooking operation has been completed, the blade 9 will move to make contact with a back contact 11 so that if the manual switch 12 has been operated the thermostat 13 will operate to occasionally activate the top heating element 2 to keep the oven warm at about 180°.

What is claimed is:
1. An oven temperature control arrangement for controlling the energization of a pair of electrical heating elements fed by a three-wire power source and adapted to control oven temperature in a high temperature, normal cooking operation range, and a lower temperature, holding operation range, comprising:
   timer operated switch means including a first switch element having a cooking operation range position closing a first circuit from one side of said three-wire source to one side of both of said pair of heating elements, and a holding operation range position connecting said one side of said three-wire source to a holding circuit in turn connected to said one side of both of said pair of heating elements, a second switch element closing a second circuit to the other side of said three-wire power source from one of said pair of said heating elements in a cooking operation range position, and opening said second circuit in a holding operation range position,
   a third circuit including a normal cooking temperature control switch having a normally closed position at temperatures in said holding operation range, said third circuit switch connecting the other side of the other of said pair of heating elements to the neutral conductor of said three-wire power source,
   said holding circuit including a normally closed thermostat arranged to open said holding circuit at any temperature above said holding temperature, said holding circuit further including a manual control switch for putting said holding circuit into and out of service.
2. In an oven of the type powered by a three-wire electrical power source and having an oven temperature control arrangement of the type in which timer switch means in a first position closes first circuit means for energizing a pair of electrical heating elements to obtain a normal cooking operation temperature range for a predetermined period, and at the expiration of this period operates to a second position to open said first circuit means and relinquish control of energization to holding circuit means for energization to obtain a relatively lower holding range of temperatures, a connecting and switch arrangement in which:
   one of said pair of heating elements is connected between opposite sides of said three-wire power source in said timer switch means first position and is disconnected in said timer switch means second position, the other of said pair of heating elements is connected between one side of said power source and neutral in both said first and second positions of said timer switch means
   so that when said timer switch means is in said second position to obtain holding temperatures heat will be supplied to said oven in response to the demand of said holding circuit at a greatly reduced rate relative to the supply of heat in the normal cooking operation condition.

References Cited by the Examiner
UNITED STATES PATENTS

| | | | |
|---|---|---|---|
| 2,914,644 | 11/1959 | Holtkamp | 219—413 |
| 2,963,566 | 12/1960 | Ross et al. | 219—494 |
| 3,170,061 | 2/1965 | Colalillo | 219—494 |
| 3,214,569 | 10/1965 | Carson | 219—413 |

RICHARD M. WOOD, *Primary Examiner.*

L. H. BENDER, *Assistant Examiner.*